June 15, 1965 W. LEATHERS 3,189,730

MECHANICAL STORAGE DEVICE FOR BUSINESS MACHINE CARD DATA

Filed April 29, 1960

2 Sheets-Sheet 1

INVENTOR.

WARD LEATHERS

INVENTOR.
WARD LEATHERS 3,189,730
MECHANICAL STORAGE DEVICE FOR BUSINESS MACHINE CARD DATA

Ward Leathers, Stamford, Conn., assignor to Burroughs Corporation, Detroit, Mich., a corporation of Michigan Filed Apr. 29, 1960, Ser. No. 25,629
9 Claims. (Cl. 235—61.11)

This invention relates generally to a data storage assemblage for utilization with data processing equipment and more particularly to an electromechanical storage assemblage having a selectively variable time delay.

It is a primary object of this invention to provide a data storage assemblage which can provide a selectively variable time delay.

It is another object of this invention to provide a data storage assemblage which can operate either continuously or selectively for sequential or simultaneous read-out.

It is still another object of this invention to provide a device which is reliable in operation and economical to build.

Other objects and many of the attendant advantages of this invention will be readily appreciated as the apparatus becomes better understood by reference to the following detailed description when considered in connection with the accompanying drawings wherein.

Similar reference characters refer to similar parts throughout the several views of the drawings.

Figure 1:
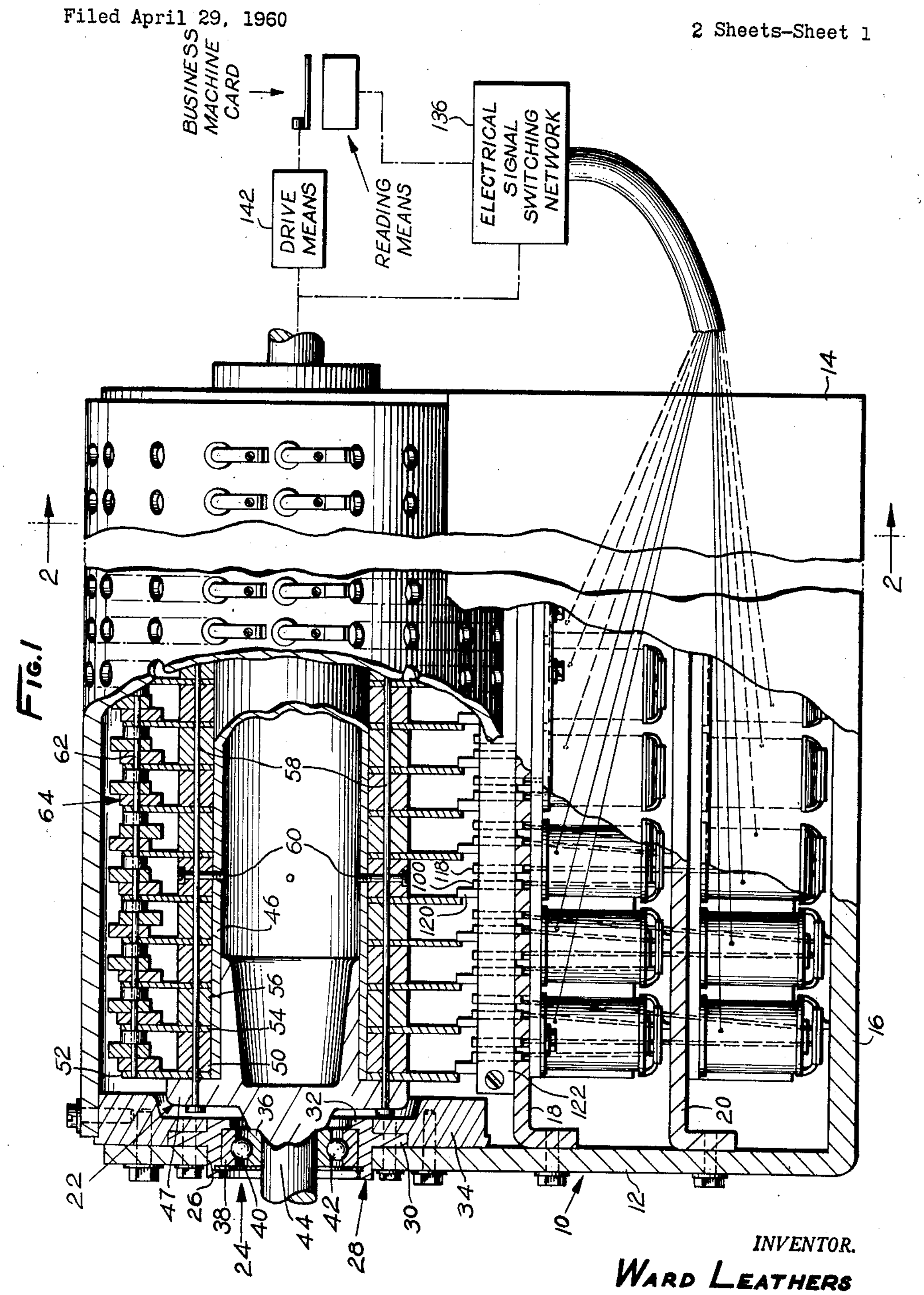
FIG. 1 is a side view of structure in accordance with the principles of this invention illustrating, in detail, a partial cut away view of a rotor and settable members.

The structure in this invention can delay and even store for a preselected time duration information sensed from a record bearing medium such as a business machine card.

Briefly, a rotor, or rotatable member supports a plurality of settable members. There is one settable member for each area on a business machine card assigned to support a bit of information and, each settable member is capable of assuming a first position or state, and a second position or state. Electrical contacts, supported by a stationary member, co-operate with the settable members to indicate electrically the state of an associated settable member. When a settable member is in the first position it shall be presumed that it is in an inactive state, and, in a like member, when the settable member is in the second position it shall be presumed that it is in an active state. Co-operating contacts will be urged to a closed condition only when the settable member is positioned to a second or active state.

In operation, a settable member is positioned initially to indicate a first or inactive state, and is driven past a setting means at the same instant that an area on a business machine card assigned to support a bit of information is driven past a reading means. If the reading means does not sense a cutout, the state of the settable member will not be altered as it moves past the setting means. However, if the reading means does sense a cutout, a signal will be generated and fed to the setting means to urge the settable member to assume a second or active state.

The information transferred to the settable members can be obtained or "readout" in one of a number of ways; first, it can be read "on the fly" after a desired time delay by positioning a pair of electrical contacts a predetermined distance from the setting means. If the rate of displacement of the rotatable means is constant, a change in the delay can be obtained by changing (increasing or decreasing) the distance between the electrical contacts and the setting means. At a specific interval of time after an area of a business machine card has been sensed, the time interval being a function of the speed of the rotatable member and the spacing between the setting means and the electrical contacts, the electrical contacts will indicate the absence or presence of a cutout in the cards by remaining in an open condition or assuming a closed condition.

Second, readout can also be obtained by first transferring the information from the business machine card to the settable members, and then stopping the rotation of the rotatable member when the settable members are positioned to cooperate with the electrical contacts; there is one set of electrical contacts for each settable member. In this embodiment it is possible to obtain very long time delays. An electrical pulse signal is fed to the electrical contacts after a predetermined interval of time which, in this instance, is determined by the time required for the settable member to move from the setting means or pawl to the electrical contacts plus the time duration that the settable member remains in position to cooperate with the electrical contacts. The electrical pulse signal is passed through only those contacts which cooperate with and have been urged to a closed condition by those settable members which have been urged to an active or second state.

Actually, each column of a business machine card supports twelve distinctive areas, each capable of supporting information in the form of a cutout or no cutout. Therefore, to receive and store all of the information that can be stored on a business machine card, the rotatable member or rotor must support twelve settable members for each column contained in a business machine card where each settable member will indicate the condition of a particular area on a card. Now, if it is assumed that twelve settable members are being oriented sequentially to conform to information contained on a business machine card, then, during readout "on the fly" the information will be presented serially. However, where the rotor is first stopped after a card has been sensed, the readout can be in either serial or parallel form. In each instance, pulse signals are first fed to each of the electrical contacts positioned to cooperate with the settable member (usually one pair of contacts for each settable member) after the rotor has been stopped. If the pulse signals are fed to the contacts sequentially, the information will be in serial form; and, if the pulse signals are fed to the contacts simultaneously, the information will be in parallel form.

Additionally, when the motion of the rotatable member is stopped after a business machine card has been sensed, the delay obtained is not limited to a portion of, or the time required for one card cycle, but can be extended to cover a number of card cycles.

With reference to FIG. 1, there is illustrated a partially cut-away side view of structure in accordance with the principles of this invention. A U shaped channel 10 having two arm members 12, 14 and a base member 16 supports two relay assemblage racks 18, 20, and a rotor assemblage 22. The relay assemblage racks 18, 20 are positioned within the channel one above the other each parallel to the base member 16 and secured to the arm members 12, 14 of the channel by screws, solder, or the like. Each relay assemblage rack supports groups of relay coils coupled to activate setting pawls. The construction and operation of this structure will be described in detail further on in this specification.

The rotor assemblage 22 is positioned within the channel between the two arm members and is rotatably supported by a low friction bearing assemblage 24 positioned within each of the arm members 12, 14. With reference to arm member 12, a cutout 26 accommodates a mounting ring 28 having an externally projecting flange 30, and an internally projecting flange 32. The externally projecting flange 30, in co-operation with the outer surface of the ring forms a shoulder which defines the position of the ring 28 within the cutout 26. A locking ring member 34 secured to the arm member by bolts, screws, or the like frictionally contacts the externally projecting flange 30 to lock the mounting ring 28 in position in the cutout 26.

The low friction ball bearing assemblage 24 comprises, basically, an inner race 36 coupled to an outer race 38 through ball bearings 40. The outer race 38 is positioned within the mounting ring 28 and locked in position against the internally projecting flange 32 by means of a snap ring fastener 42.

The other arm member 14 of the U shaped channel 10 supports a low friction ball bearing assemblage which is constructed and supported in a manner similar to low friction ball bearing assemblage 24 supported by arm 12 and, therefore, a detailed description of this structure is not necessary.

The inner race of each low friction ball bearing assemblage 24 is coupled rigidly to and rotatably supports an end projecting bearing 44. The end projecting bearing 44 is secured rigidly by pins, screws, or the like to an open end of a light weight tube 46 composed of aluminum, plastic, or the like. At the other end of the tube 46 there is another end projecting bearing similar to bearing 44. Each end projecting bearing supports an outwardly projecting flange 47 which extends beyond the outer surface of the tube 46. The tube 46, in combination with the end projecting bearings 44 forms a mandrel which supports a number of spacer rings and a number of partition rings. Each ring extends completely around a portion of the tube 46. The partition rings and the spacer rings are spaced alternately along the length of the tube 46 from one projecting flange 47 to the other. Proceeding lengthwise from left to right along the tube 46, positioned adjacent to the outwardly projecting flange 47 is a partition ring 52; then, positioned adjacent to the partition ring 52 is a spacer 50; then, positioned adjacent to the spacer ring 50 is another partition ring 54; then, positioned adjacent to the partition ring 54 is still another spacer ring 56, and so on in this alternate order until the tube is covered completely by the rings, the stack of rings terminating with a partition ring being positioned adjacent to the projecting flange of the other end projection. The rings fit snugly around the tube 46, and are locked together by means of a number of bars 58 spaced equally around the tube. The bars pass through each of the spacer and projection rings, and the ends of the bars are secured rigidly to the projecting flanges to prevent both the separation or rotation of the rings relative to each other.

Further, to insure the locking of the rings to the tube 46, and to also eliminate the possibility of slippage of the rings relative to the tube 46, small set screws 60 positioned within each fifth spacer ring, more or less, extend into the tube 46 to lock the rings to the tube.

All of the rings have the same inside diameter, however, the outside diameter of the partition rings is measurably larger than the outside diameter of the spacer rings, and the spacer rings are substantially thicker than the partition rings. It is to be understood, however, that neither the thickness, nor the diameter of the rings is critical, and that the dimensions of the rings can vary to satisfy desired design, manufacture, and operation procedures.

Figure 2:
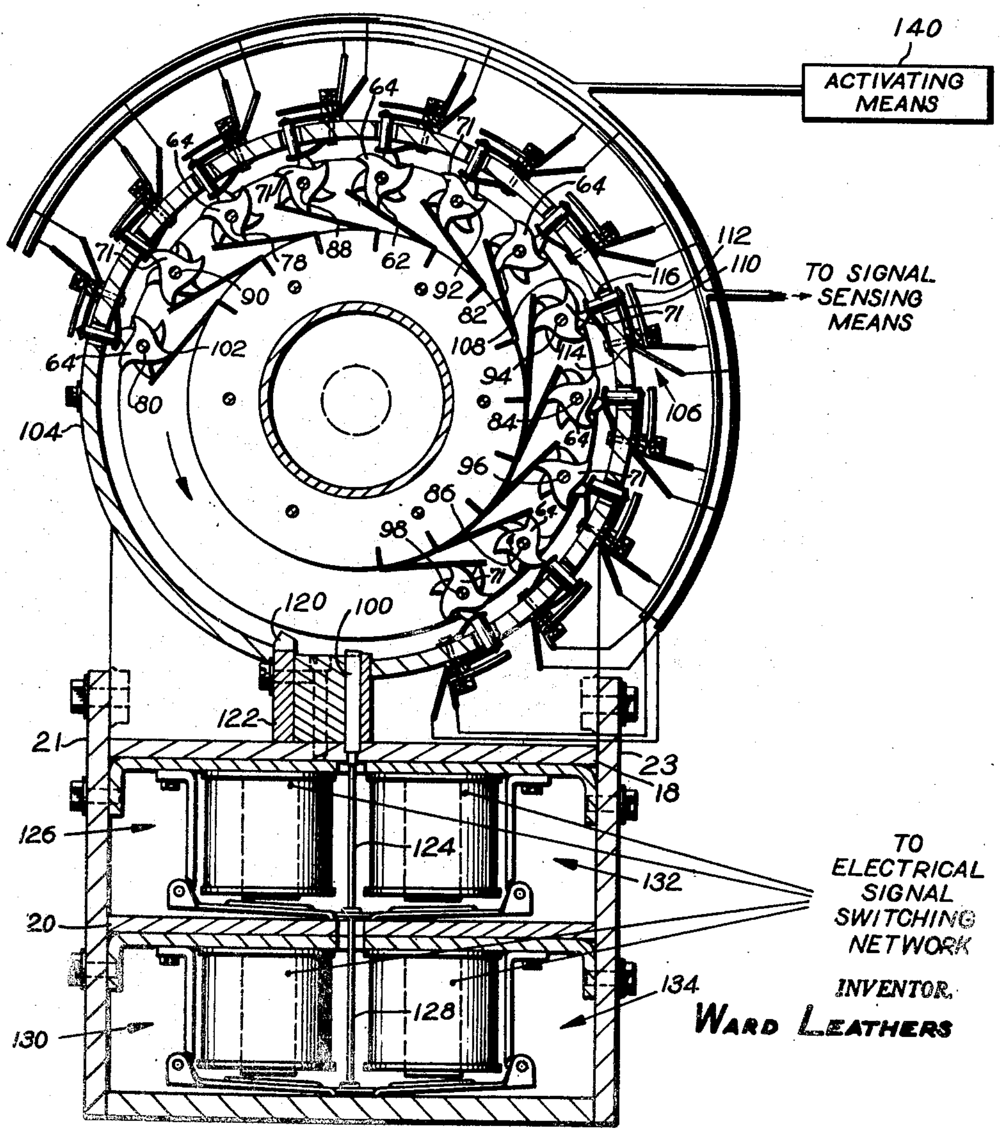
FIG. 2 is a section view along the line 2—2 of FIG. 1.

With references to FIG. 2, the partition rings of the rotor or rotor assemblage 22 support twelve support shafts positioned equally around three-fourths of the circumference of the rotor. Each support shaft supports groups of star wheel assemblages. However, to insure reliable operation at high speeds, the arrangement of the star wheel assemblages on adjacent support shafts vary slightly, while the star wheel assemblages on alternate support shafts are identical. The star wheel assemblages on common support shafts represent the rows in a matrix of star wheel assemblages, and are similar to the rows of a business machine card; and the star wheel assemblages positioned between common partition rings represent the columns in a matrix of star wheel assemblages, and are similar to the columns of a business machine card.

Figure 3:
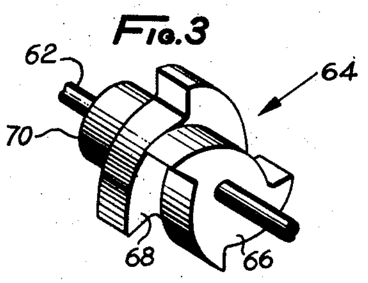
FIG. 3 is an isometric view of a first settable mamber.
Figure 4:
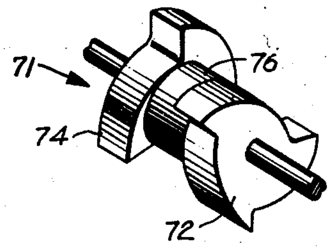
FIG. 4 is an isometric view of a second settable member.

In FIG. 3, there is illustrated a first settable member or star wheel assemblage and, in FIG. 4 there is illustrated a second settable member or star wheel assemblage.

With reference to FIG. 3, the star wheel 64 is made up of three wheels; a resetting wheel 66, and setting wheel 68, and a spacer wheel 70—all locked together to form a single rigid unit rotatably supported by shaft 62 which extends through a centrally positioned clearance cutout. The resetting wheel 66 supports three wedge shaped projections or teeth spaced equidistant from each other around the periphery of the wheel. The setting wheel 68 is similar in design to the resetting wheel 66, and, therefore, also supports three wedge shape projections or teeth spaced equidistant from each other around the periphery of the wheel. The spacer wheel 70 does not support any projection, however, its outside diameter is smaller than the base or inner diameter of the projections of the setting and resetting wheels. The setting wheel 68 is positioned between the resetting wheel 66 and the spacer wheel 70, and the resetting wheel is rotated relative to the setting wheel until the projections or teeth associated with the setting wheel occur midway between the projections or teeth associated with the resetting wheel. The three wheels are locked together by keying, solder, pins or the like to form a single rigid settable member or star wheel assemblage having a centrally positioned cutout through which the support shaft 62 extends to rotatably support the single star wheel assemblage.

With reference to FIG. 4, there is shown another arrangement of a single rigid star wheel assemblage 71 or settable member composed of a resetting wheel 72, and setting wheel 74, and a spacer wheel 76. Each wheel of FIG. 4 is identical in every respect to its corresponding wheel of FIG. 3. However, in the assemblage in FIG. 4 the spacer wheel 76 is positioned between, and locked to the resetting wheel 72 and the setting wheel 74, while in the assemblage of FIG. 3 it is the setting wheel 68 which is positioned between, and locked to the resetting wheel and the spacer wheel.

Referring again to FIG. 1, positioned within each space provided by each spacer ring positioned between and further defined by adjacent partition rings, and rotatably supported by the support shafts is a plurality of star wheel assemblages.

There are as many star wheel assemblages coupled to a common support shaft as there are columns required; and, with reference to FIG. 2, there are as many support shafts (which support groups of star wheels) as there are rows required.

As an example, if the information contained on a business machine card is to be transferred to and stored within the structure of this invention, then twelve support shafts—one support shaft for each row of information, and eighty star wheel assemblages rotatably supported by each support shaft—one star wheel assemblage for each column of information, will be required. Thus, the number of star wheel assemblages employed will equal the number of wheels on a support shaft multiplied by the number of support shafts. For convenience, it shall be assumed that the star wheel assemblages supported rotatably by support shaft 62 are each similar to the assemblage illustrated in FIG. 3.

To insure reliable operation of this invention during high speed operation, the star wheel assemblage 64 illustrated in FIG. 3 as rotatably supported by support shaft 62, is not supported by each of the support shafts—but only by every other or alternately appearing support shaft. Thus, with reference to FIG. 2, support shafts 80, 78, 82, 84, and 86, in addition to shaft 62, will each support star wheel assemblages similar to the assemblage 64 illustrated in FIG. 3. The other support shafts, shafts 90, 88, 92, 94, 96, and 98, each supports star wheel assemblages similar to the assemblage 71 illustrated in FIG. 4. The star wheel assemblages illustrated in FIGS. 3, and 4 are positioned on alternately appearing support shafts to prevent a setting pawl 100, or 118 (which is urged upward each time a hole is sensed in a business machine card to urge a particular wheel assemblage to assume a new position) from contacting and re-positioning a next appearing and undesired wheel assemblage. Actually, alternate positioning of the first and second setting wheels on adjacent support shafts permits the use of a small diameter rotor assemblage, and/or the use of relatively slow acting setting pawls. If the setting wheels on adjacent support shafts were aligned with each other rather than being offset relative to each other, the activated setting pawl would have to be withdrawn very quickly before the next appearing star wheel assemblage appears or it too would be urged to a new position. By alternating or staggering the position of the setting wheels on adjacent support shafts, the setting pawl has twice as much time to assume its de-activated state.

Referring further to FIG. 2, each star wheel assemblage co-operates with a holding member 102 which functions as a yieldable lock to hold the star wheel assemblages in their driven position. The holding member 102 is a flat spring having one end anchored securely to the spacer ring, and is positioned and conditioned to urge its other end against the co-operating star wheel assemblage. The flat spring has a width which is slightly less than the thickness of the three wheels of the star wheel assemblages of FIGS. 3 and 4, and contacts two teeth—one on the resetting wheel and one on the setting wheel, each simultaneously. The flat spring yieldably locks a settable member or wheel assemblage in a first state or a second state. A wheel assemblage is in a second or active state when a tooth of the resetting wheel is in a fully extended position, and the wheel assemblage is in a first or inactive state when a tooth of the resetting wheel is not in a fully extended position. A tooth is in a fully extended position when the tip of a tooth cannot be positioned to occupy a position further from the center of the rotor assemblage than it presently occupies.

The star wheel assemblages, in operation, are stepped selectively, clockwise, around the support shafts. The holding members, by contacting two teeth at one time will hold the star wheel assemblages in one of two positions. The first position is when a tooth of the setting wheel is fully extended—and the second position is when a tooth of the setting wheel is not fully extended. It should be noted that, on any one wheel, when none of the teeth of the setting wheel are fully extended—then a tooth on the resetting wheel will be fully extended; and when a tooth of the setting wheel is fully extended—none of the teeth on the resetting wheel will be fully extended.

Continuing with FIG. 2, two side plates 21 and 23 are secured rigidly by screws to the sides of the U shaped channel and to the relay assemblage racks 18, 20. A cylinder 104 positioned around and aligned with the rotor assemblage 22 is secured rigidly to the two side plates 12, 14 by means of screws, bolts, or the like. It is the prime purpose of cylinder 104 to support a number of sets of contacts 106 for each star wheel assemblage. A screw, rivet or the like extends through the wall of the cylinder to secure one end of a narrow strip spring member 108 to the inside surface of the cylinder, and a movable contact 110 and a stationary contact 112 to the outside surface of the cylinder. The movable contact 110 and the stationary contact 112 are each insulated from each other and from the cylinder 104 by means of an insulator block 114. Normally, the contacts assume an open condition. A connecting push rod 116 positioned between the unsecured end of the narrow strip spring member 108 and the movable contact 110 is secured rigidly to the movable contact 110. The narrow strip spring member has a width slightly less than the width of the resetting wheels of the star wheel assemblages.

Still referring to FIG. 2, there is one set of contacts 106, and one narrow strip spring member 108 for each star wheel assemblage on the rotor assemblage. Each narrow strip spring member 108 is positioned in alignment with the resetting wheel only of each star wheel assemblage.

The narrow strip spring members are positioned to contact only the resetting wheels, and then only when a tooth of the resetting wheels is in its fully extended position. The diameter of the resetting wheel is the same as the diameter of the setting wheel. Therefore, to prevent co-operation between the resetting wheel and the narrow strip spring member, the narrow strip spring member is offset relative to the resetting wheels. In operation, the star wheel assemblages are positioned selectively to a first or a second state and are retained in position by their co-operating holding members 102. In the second or active state a tooth of a resetting wheel is fully extended so that it projects radially outwardly, it being seen that an extended tooth will be provided from resetting wheel 66 if assemblage 64 is actuated, or from resetting wheel 72 if assemblage 71 is actuated. This extended tooth contacts the narrow strip spring member and urges the spring and the push rod outward to close the co-operating set of contacts. In the first or inactive state of both assemblages 64 and 71, none of the teeth of a resetting wheel are extended fully and none of the teeth will contact the narrow strip spring members; and the contacts will remain open.

The rotor assemblage and the star wheel assemblages are driven continuously in the direction indicated by the arrow of FIG. 2. Now, if it is assumed that the star wheel assemblage supported by support shaft 90 is positioned by the setting pawl to indicate an active state, then as this star wheel assemblage is driven past each narrow strip spring member it will close each set of contacts sequentially. This occurs because all of the resetting wheels and the narrow strip spring members are aligned with each other. Thus, a star wheel assemblage which co-operates with a particular narrow strip spring member and its contacts will also co-operate with each other narrow strip spring member and its contacts.

Proceeding further, the position of each star wheel assemblage can be ascertained quickly and easily by noting which contacts pass a pulse signal. If a pulse signal is fed to the movable contacts of each set of contacts, then only those contacts which are associated with a star wheel assemblage driven to indicate an active state will be closed and will pass a pulse signal.

The star wheel assemblages are positioned initially to indicate an inactive state (a no hole position in a business machine card); and each is set selectively to indicate an active state by a co-operating one of two setting pawls 100, 118; and are reset to indicate an inactive state by a resetting pawl 120. A mounting block 122 secured rigidly to the top positioned relay assemblage rack 18 supports the setting and the resetting pawls. The mounting block 122 extends along the relay assemblage rack 18 for the length of the rotor assemblage, and fixedly supports one resetting pawl 120 for each column or group of star wheel assemblages positioned around a common spacer ring.

The resetting pawl, aligned with the resetting wheels 66 and 72 of the star wheel assemblages, contacts only a fully extended tooth of the setting wheel in a star wheel assemblage conditioned to indicate an active state to urge the star wheel assemblage to rotate clockwise one position to indicate an inactive state. The resetting pawl will not contact a star wheel assemblage that does not indicate an active state. Thus, resetting pawl 120 restores or normalizes any star wheel assemblage which had been in the active or actuated state.

The mounting block 122 also supports two setting pawls for each column or group of star wheel assemblages positioned around a common spacer ring. One setting pawl 100 is aligned with the setting wheels of the star wheel assemblages shown in FIG. 3; and the other setting pawl 118 is aligned with the setting wheels of the star wheel assemblages shown in FIG. 4. Each setting pawl is slightly thinner than the setting wheels, and setting pawl 100 is positioned to contact only the setting wheels 68, while setting pawl 118 is positioned to contact only the setting wheel 74. Setting pawl 100 is connected through a linkage 124 to an energizing means such as the movable armature of an electromagnetic assemblage 126; and setting pawl 118 is connected through a linkage 128 to an energizing means such as the movable armature of an electromagnetic assemblage 130. Energizing means 132 and 134 are connected to adjacently positioned setting pawls. Thus, each setting pawl 100 or 118 is connected to and selectively positioned by an electro-magnetic assemblage or relay. Each group of four relays controls selectively the four setting pawls for two adjacently positioned columns of wheels. The relays 126 and 132 are secured rigidly by bolts, screws, or the like to the relay assemblage rack 18; and the relays 130 and 134 are secured rigidly by bolts, screws, or the like to the relay assemblage rack 20. The relay assemblage racks contain openings through which the linkages from the relays to the setting pawls pass. Two relays are required for each column or group of star wheel assemblages positioned around a common spacer ring.

In operation, the rotor assemblage is driven at a constant speed in a counter clockwise direction as indicated by the arrow in FIG. 2. Initially, it shall be presumed that each star wheel assemblage is set to indicate an inactive state (none of the resetting wheels are oriented to present a tooth which is fully extended).

To simplify the explanation of the operation of this invention it shall be assumed that information stored on a business machine card is to be transferred to and stored by this invention—it being understood, however, that this invention is not limited to use with business machine cards but can be used in combination with other record bearing media.

It shall also be assumed that the group of star wheel assemblages illustrated in FIG. 2 represents the first column of a business machine card, and that the relays 126, 130 are connected through an electrical signal switching network 136 to a reading means positioned to sense information on the business machine card. The electrical signal switching network is connected directly to the business machine card drive means and couples the reading means to the coil of relay 126 each instant it is positioned adjacent to an odd numbered row, and couples the reading means to the coil of relay 130 each instant it is positioned adjacent to an even numbered row. The rotor assemblage and star wheel assemblages are driven in synchronism with the business machine card drive mechanism by a drive means 142 to insure the accurate positioning of a next appearing star wheel assemblage adjacent to the setting pawls each instant the reading means senses a new information area on the business machine card.

Now, it shall further be assumed that the setting pawl 100 is positioned to co-operate with the setting wheels 68 of the star wheel 64 supported rotatably by alternate shafts 80, 78, 62, 82, 84, and 86; and that setting pawl 118 is positioned to co-operate with the setting wheels 74 of the star wheel assemblages 71 supported rotatably by alternate shafts 90, 88, 92, 94, 96, and 98. Additionally, it shall also be assumed that only the second and eleventh rows in the column sensed by the reading means contains information in the form of a cutout, and that none of the other positions contain or support a cutout.

As shown, resetting pawl 120 is positioned to engage resetting wheels 66 and 72 of both assemblages, and is disposed so as to intercept these assemblages during the rotational cycle of the drum before pawls 100 and 118. Thus, each actuated assemblage will be reset to its first or normal state before it is intercepted by setting pawls 100 and 118.

Now, as the reading means senses the first position on the card, the star wheel assemblage supported by shaft 80 approaches setting pawl 100. However, the first position or row of the card does not contain a cutout, a signal is not fed through the signal switching network to the relay 126, and pawl 100 remains in its withdrawn position, and star wheel assemblage remains in its inactive state. Continued operation positions the second row on the card next to the reading means at the same instant that the setting wheel 74 of the star wheel assemblage 71 supported by shaft 90 approaches pawl 118. At this instant the reading means senses the cutout in the card and feeds a pulse signal through the electrical switching network 136 to energize the relay 130. Energized relay 130, acting through linkage 128 raises pawl 118 into the path of an extended tooth on the wheel 74. Further rotation of the rotor assemblage drives the extended tooth of the setting wheel in the star wheel assemblage supported by shaft 90 into the raised pawl 118. The pawl urges the star wheel assemblage to rotate clockwise about the shaft 90 one position against the action of the holding member. The star wheel assemblage actually pivots about the setting pawl and assumes a position which indicates an active state—a position where a tooth of the resetting wheel assumes a most extended condition, and none of the teeth of the setting wheel assume a most extended condition.

Continued operation positions the third row on the card next to the reading means at the same instant that the setting wheel 68 of the star wheel assemblage 64 supported by shaft 78 approaches setting pawl 100. However, since the card does not support a cutout in its third row the reading means does not feed a signal through the signal switching network to the relay 126, and the star wheel assemblage passes over the withdrawn pawl 100 to continue to indicate an inactive state. It is to be noticed that the star wheel assemblage supported by shaft 78 can only be set to indicate an active state by extended pawl 100. Setting pawl 118 cannot exert any influence on the starwheel assemblage 64 supported by shaft 78 as pawl 118 is aligned with the spacer wheel 70, it is not aligned with the setting wheel 68. Therefore, pawl 118 which was extended to urge the star wheel assemblage 71 supported by shaft 90 from an inactive to an active state does not have to return to its withdrawn position prior to the arrival of the next appearing star wheel assemblage. However, pawl 118 must be returned to its withdrawn position prior to the arrival of the star wheel assemblage 71 supported by shaft 88.

By utilizinig displaced setting pawls where each pawl cooperates with star wheel assemblages located in alternate positions it is possible to obtain reliable operation at high machine operating speeds without requiring the use of high speed operating relays.

Continued operation of this invention permits the star wheel assemblages supported by shafts 88, 62, 92, 82, 94, 84, 96, and 98 to move past the setting pawls without being reoriented; the star wheel assemblage supported by shaft 86 being the only one of this group to be urged to rotate one position to indicate an active state.

At some instant after each row on the card has been read the rotor assemblage assumes the position illustrated in FIG. 2, and a pulse signal is fed simultaneously from an activating means 140 to the movable contact of each set of contacts. Each set of contacts represents a possible cutout position or hole in one row on the business machine card and—for the example given above a pulse signal will appear only at the second and eleventh set of contacts which represent the second and eleventh rows on the business machine card. These signals are detected and their position in the row noted by a signal sensing means. These sets of contacts are the only contacts closed because only the star wheel assemblages supported by shafts 90 and 86 were rotated to indicate an active state by positioning a tooth of the resetting wheel to assume a most extended position. The sets of contacts can only be closed by a tooth of a resetting wheel positioned in a most extended position.

In the example just illustrated the information on a business machine card was first transferred to this device, and then—after a predetermined interval of time—readout simultaneously, also known as, in parallel. The information fed to this device can be stored for any desired period of time by merely stopping the rotation of the rotor assemblage in the position shown in FIG. 2, for the required interval of time; or by driving the rotor at a constant speed and selectively positioning or moving all of the sets of contacts as a group either closer to the setting pawls if a shorter time delay is required, or further away from the pawls if a greater time delay is required. In this last mentioned procedure it is possible to obtain a desired time delay and still have parallel read out "on the fly." If the time delay desired is greater than the time delay that can be obtained by increasing the distance between the pawls and the group of contacts—then the rotor must be stopped in the position indicated in FIG. 2, for the desired interval of time. Obviously, in this instance there cannot be read out "on the fly." In either instance, however, parallel read out is obtained by feeding a pulse signal simultaneously to each of the electrical switches.

In some applications it is desirable to obtain the information serially—in the order that it is sensed or detected—after a given time delay. With this invention serial readout can be obtained in any one of the following ways. First, serial readout can be obtained with a single set of contacts. The contacts such as contacts 106 are first positioned accurately relative to the setting pawl a predetermined distance required to give the desired time delay. The contacts are energized continuously. Now, in operation, the rotor assemblage serially positions the star wheel assemblages of a column adjacent to the setting pawl and then adjacent to the set of contacts. Each star wheel assemblage is presented adjacent to the contacts a predetermined interval of time after it passes the setting pawl. Thus, the single set of electrical contacts cooperates serially with the star wheel assemblages, and a serial output is obtained. Obviously, the signal sensing means in the output circuit is designed to identify the position that the pulse signal occupies in the column being read. Second, serial read out can also be obtained by first setting each star wheel assemblage to indicate the information on a business machine card; and then stopping the rotation of the rotor assemblage in the position shown (FIG. 2) for the required interval of time. Now, instead of feeding a pulse signal simultaneously to each of the contacts, the pulse signal is fed sequentially to each of the contacts. Third, serial readout "on the fly" can be obtained by first setting each star wheel assemblage to indicate the information contained on a business machine card; and then—when the rotor assemblage is in the position shown in FIG. 2 a pulse signal is fed sequentially to each of the electrical contacts. It is to be noted that in this instance the rotor assemblage is not stopped. However, in this application the pulse signal must be stepped very rapidly relative to the rotation of the rotor assemblage and must start after the star wheel assemblages are positioned to orient their associated contacts, and must finish before the star wheel assemblages move past their associated contacts. If the pulse signal is stepped very rapidly from the first set of contacts to the last, the effect will be the same as if the rotor assemblage were stopped when the contacts were energized sequentially.

The foregoing describes the setting and readout from one column of the assemblages corresponding to one column on the card. It will be understood of course that if the device is designed for use with an 80-column card, there would be 80 sets of star wheel assemblages and means for setting and reading them out as described above with respect to one column.

Obviously many modifications and variations of the present invention are possible in the light of the above teachings. It is therefore to be understood that within the scope of the appended claims the invention may be practiced otherwise than as specifically described.

What is claimed is:

1. A data storage device comprising a rotor, a first wheel assemblage capable of assuming a first or a second state supported rotatably by said rotor, first wedge shaped projections supported by said first wheel assemblage, a second wheel assemblage capable of assuming a first or a second state supported rotatably by said rotor, second wedge shaped projections supported by said second wheel assemblage, drive means coupled to move said rotor in synchronism with the advance of a record bearing medium past a reading means, a resetting pawl fixedly positioned to contact said first and second wedge shaped projections to urge sequentially said first and second wheel assemblages to the first state, a first setting pawl positioned to contact said first wedge shaped projections to urge selectively said first wheel assemblage to the second state, a second setting pawl positioned adjacent to said first setting pawl to contact said second projections to urge selectively said second wheel assemblage to the second state, a first electromagnetic assemblage coupled to position said first setting pawl, a second electro-magnetic assemblage coupled to position said second setting pawl, an electrical switching network fed by said reading means to condition alternately for energization said first and second electro-magnetic assemblages, first electrical contacts positioned to sense sequentially the state of said first and second wheel assemblages, second electrical contacts positioned in tandem with said first electrical contacts to sense sequentially the state of said first and second wheel assemblages, and activating means coupled to energize selectively said first and second electrical contacts.

2. A data storage device comprising a rotatable drum, a plurality of settable members each capable of assuming a first or a second state, said settable members being supported on the surface of said rotatable drum in a plurality of columns and rows, drive means for driving said rotatable drum in cycles of rotation, a row of elements fixedly positioned relative to said rotatable drum to contact said settable members during a rotational cycle of said drum to set said settable members to the first state, a plurality of first setting elements movable into and out of the path of alternate rows of said settable members during rotation of said drum, a plurality of second setting elements movable into and out of the path of the remaining alternate rows of said settable members during rotation of said drum, means for selectively actuating said first and second setting elements to move into the path of selected settable members to set same to the second state during the rotation of said drum, and means for sensing selectively the states of said settable members.

3. A data storage device comprising a rotor, a first plurality of rotatably settable members capable of assuming a first or a second state supported by said rotor, a second plurality of rotatably settable members having a structure different than the structure of the members of said first plurality of members and which are capable of assuming a first or a second state and are supported by said rotor, said first plurality of members being arranged in first rows parallel to the axis of rotation of said rotor, said second plurality of members being arranged in second rows parallel to said axis of rotation and said second rows alternating with said first rows, drive means coupled to move said rotor in synchronism with the advance of a record bearing medium past a reading means, first means which is stationary and positioned to urge said settable members to the first state, second means coupled to the reading means positioned to urge selectively said first plurality of members to the second state, third means coupled to the reading means positioned to urge selectively said second plurality of members to the second state, and fourth means to sense selectively the state of said settable members.

4. In a data storage device of the type having a plurality of parallel rods spaced in a circle, a plurality of rotatably settable elements on each rod, a setting station, means for moving the rods past the station successively, and means at the station for selectively setting any element on a rod, wherein the improvement comprises staggering the position of the settable elements on adjacent rods of said plurality of parallel rods, and providing a first movable member for setting the elements on alternate rods of said plurality of parallel rods and a second movable member for setting the elements on rods adjacent said alternate rods.

5. In a data storage device of the type having a plurality of parallel rods spaced in a circle, a plurality of rotatable settable elements on each rod, a setting station, means for moving the rods past the station successively, and means at the station for selectively setting any element on a rod, wherein the improvement comprises alternately offsetting the positions of the settable elements in two parallel planes, and providing a first member movable into and out of the path of travel of the elements in one of said planes for setting the same and a second member movable into and out of the path of travel of the elements in the other of said planes for setting the same.

6. A data storage device comprising: a rotor; a first plurality of rotatably settable assemblages capable of assuming a first and second state supported by said rotor; each settable asssemblage of said first plurality of assemblages includes a resetting element, a spacer element, and a setting element rigidly affixed to and disposed between said resetting and spacer elements; a second plurality of rotatably settable assemblages capable of assuming a first and a second state supported by said rotor; each settable assemblage of said second plurality of assemblages includes a resetting element, a setting element, and a spacer element rigidly affixed to and disposed between said resetting and setting elements; said first and second plurality of assemblages being arranged around the axis of rotation of the rotor in alternate relation to one another and such that the setting elements of the two pluralities of assemblages traverse separate paths of travel; drive means coupled to rotate said rotor in synchronism with the advance of a record bearing medium past a reading means; stationary first means positioned to urge said settable assemblages to the first state; second means coupled to the reading means and positioned to urge selectively said first plurality of assemblages to the second state; third means coupled to the reading means and positioned to urge selectively said second plurality of assemblages to the second state; and fourth means to sense selectively and electrically the state of said settable assemblages.

7. A data storage device according to claim 6, wherein all of the setting and resetting elements have the same shape and dimensions; each setting and resetting element has three equiangularly spaced-apart projections around its respective element; and in each assemblage the projections on the setting element are disposed in profile midway between the projections on the resetting element.

8. A data storage device according to claim 6 wherein the settable assemblages are supported on the rotor in a plurality of columns and rows corresponding to the columnar and row arrangement of data representations on said record bearing medium; the resetting elements for each column lie in a plane normal to said axis of rotation; the spacer elements of the first plurality of settable assemblages and the setting elements of the second plurality of settable assemblages for each column lie in a plane normal to said axis of rotation; and the setting elements of the first plurality of settable assemblages and the spacer elements of the second plurality of settable assemblages for each column lie in a plane normal to said axis of rotation.

9. A data storage device according to claim 6, including a first electromagnetic assembly coupled to position said second means; a second electromagnetic assembly coupled to position said third means; an electrical switching network fed by said reading means to condition alternately for energization said first and second electromagnetic assemblies; first electrical contacts positioned to sense sequentially the state of said first and second settable assemblages; second electrical contacts positioned in tandem with said first electrical contacts to sense sequentially the state of said first and second settable assemblages; and activating means coupled to energize selectively said first and second electrical contacts.

References Cited by the Examiner

UNITED STATES PATENTS 2,755,023 7/56 Cooper et al. ---------- 235—61.11

MALCOLM A. MORRISON, *Primary Examiner.*

CORNELIUS D. ANGEL, *Examiner.*